United States Patent
Huber et al.

(10) Patent No.: US 10,077,729 B2
(45) Date of Patent: Sep. 18, 2018

(54) INTERNAL COMBUSTION ENGINE HAVING A REGULATING DEVICE

(71) Applicant: GE Jenbacher GmbH & Co OG, Jenbach (AT)

(72) Inventors: Johannes Huber, Brandenberg (AT); Herbert Kopecek, Schwaz (AT); Nikolaus Spyra, Innsbruck (AT); Michael Waldhart, Telfs (AT)

(73) Assignee: GE Jenbacher GmbH & Co. OG, Jenbach (AT)

( * ) Notice: Subject to any disclaimer, the term of this patent is extended or adjusted under 35 U.S.C. 154(b) by 15 days.

(21) Appl. No.: 14/794,072

(22) Filed: Jul. 8, 2015

(65) Prior Publication Data
US 2016/0025024 A1   Jan. 28, 2016

(30) Foreign Application Priority Data

Jul. 22, 2014   (AT) .................... 575/2014

(51) Int. Cl.
*F02D 41/14*   (2006.01)
*F02D 41/26*   (2006.01)
(Continued)

(52) U.S. Cl.
CPC .......... *F02D 41/1401* (2013.01); *F02B 75/10* (2013.01); *F02D 19/023* (2013.01);
(Continued)

(58) Field of Classification Search
CPC ............... F02D 19/023; F02D 41/0027; F02D 41/0028; F02D 41/1401; F02D 41/1475;
(Continued)

(56) References Cited

U.S. PATENT DOCUMENTS 4,867,127 A * 9/1989 Quirchmayr ............ F02B 63/04
                                                                    123/438
5,660,157 A   8/1997 Minowa et al.
(Continued)

FOREIGN PATENT DOCUMENTS

CN       102667723 A     9/2012
EP       0 687 809       12/1995
(Continued)

OTHER PUBLICATIONS

European Search Report dated Dec. 17, 2015 in corresponding European Application No. 15002250 (with English translation).
(Continued)

*Primary Examiner* — John Kwon
*Assistant Examiner* — Johnny H Hoang
(74) *Attorney, Agent, or Firm* — GE Global Patent Operation; Rita D. Vacca (57) ABSTRACT

An internal combustion engine (1) having a regulating device (C) wherein an air-fuel mixture with a combustion air ratio ($\lambda$) which is adjustable by the regulating device is burnt in the internal combustion engine, wherein the regulating device (C) has a power output regulating circuit adapted to adapt an actual output ($P_g$) of the internal combustion engine (1) to a reference power output ($P^d_g$) of the internal combustion engine (1) by way of an adjustment of the combustion air ratio ($\lambda$), and a NOx emission regulating circuit adapted by way of a functional relationship (2) to actuate actuators influencing a charge pressure as an alternative parameter for the NOx emission by the charge pressure such that a charge pressure reference value ($p^d_{im}$) can be set for each reference power output ($P^d_g$) of the internal combustion engine.

11 Claims, 7 Drawing Sheets

(51) Int. Cl.
*F02D 41/00* (2006.01)
*F02B 75/10* (2006.01)
*F02D 19/02* (2006.01)

(52) U.S. Cl.
CPC ..... *F02D 41/0027* (2013.01); *F02D 41/0087* (2013.01); *F02D 41/1475* (2013.01); *F02D 41/26* (2013.01); *F02D 41/1497* (2013.01); *F02D 2041/142* (2013.01); *F02D 2041/1409* (2013.01); *F02D 2041/1412* (2013.01); *F02D 2041/1418* (2013.01); *F02D 2041/1433* (2013.01); *F02D 2200/0406* (2013.01); *F02D 2250/18* (2013.01); *F02D 2250/21* (2013.01); *F02D 2250/36* (2013.01); *Y02T 10/32* (2013.01)

(58) Field of Classification Search
CPC ............ F02D 41/1497; F02D 41/26; F02D 2200/0406; F02D 2041/1409; F02D 2041/1412; F02D 2041/1418; F02D 2041/1433; F02D 2041/142; F02D 2250/18; F02D 2250/21; F02D 2250/36; Y02T 10/32
USPC .............. 701/103; 123/429, 700, 704, 123/406.12–406.14, 406.41, 406.42, 123/406.63, 406.49
See application file for complete search history.

(56) References Cited

U.S. PATENT DOCUMENTS

| | | | |
|---|---|---|---|
| 5,738,070 A * | 4/1998 | Donaldson | F02D 41/0027 123/352 |
| 5,992,385 A * | 11/1999 | Hess | F02P 5/152 123/406.23 |
| 6,178,927 B1 | 1/2001 | Rieck et al. | |
| 6,728,625 B2 * | 4/2004 | Strubhar | F02D 29/06 123/480 |
| 7,191,772 B2 * | 3/2007 | Robitschko | F02D 19/081 123/299 |
| 7,267,100 B2 | 9/2007 | Nakagawa et al. | |
| 7,932,480 B2 | 4/2011 | Gu et al. | |
| 8,215,284 B2 | 7/2012 | Suzuki et al. | |
| 8,541,716 B2 | 9/2013 | Gu et al. | |
| 9,267,483 B2 * | 2/2016 | Diehl | F02D 19/022 |
| 2002/0092498 A1 | 7/2002 | Plohberger et al. | |
| 2005/0103309 A1 | 5/2005 | Nakagawa et al. | |
| 2006/0011179 A1 | 1/2006 | Robitschko et al. | |
| 2007/0235440 A1 | 10/2007 | Gu et al. | |
| 2008/0120009 A1 | 5/2008 | Livshiz et al. | |
| 2010/0043744 A1 | 2/2010 | Suzuki et al. | |
| 2010/0288231 A1 * | 11/2010 | Zumbaugh | F02D 37/02 123/406.12 |
| 2011/0106949 A1 | 5/2011 | Patel et al. | |
| 2012/0061369 A1 | 3/2012 | Gu et al. | |
| 2013/0131956 A1 | 5/2013 | Thibault et al. | |
| 2013/0291834 A1 * | 11/2013 | Diehl | F02D 19/022 123/406.12 |
| 2013/0298869 A1 | 11/2013 | Hirzinger et al. | |
| 2014/0252885 A1 | 9/2014 | Yamamoto | |

FOREIGN PATENT DOCUMENTS

| | | |
|---|---|---|
| EP | 1 158 149 | 11/2001 |
| EP | 1 255 330 | 7/2002 |
| EP | 1 602 813 | 12/2005 |
| EP | 2 594 443 | 5/2013 |
| JP | 63-502680 | 10/1988 |
| JP | 11-324784 | 11/1999 |
| JP | 2009-144627 | 7/2009 |
| JP | 2013-20646 | 1/2013 |
| JP | 2013020464 A | 1/2013 |
| JP | 2013-107631 | 6/2013 |
| JP | 2013-160215 | 8/2013 |
| JP | 2013-231428 | 11/2013 |
| WO | 02/081888 | 10/2002 |
| WO | 2012/097389 | 7/2012 |

OTHER PUBLICATIONS

Japanese Office Action issued in connection with corresponding JP Application No. 2015142710 dated Jun. 29, 2016.
Unofficial English Translation of Japanese Office Action issued in connection with corresponding JP Application No. 2015142710 dated Apr. 18, 2017.
Unofficial English Translation of Chinese Office Action issued in connection with corresponding CN Application No. 201510433951.2 dated May 27, 2017.

* cited by examiner

Fig. 1
State of the art

INTERNAL COMBUSTION ENGINE HAVING A REGULATING DEVICE

BACKGROUND OF THE INVENTION

The present invention concerns an internal combustion engine having a regulating device.

In the regulating strategy known from EP 0 259 382 B1 a charge pressure reference value is generated in dependence on a measured actual power output of the internal combustion engine and the lambda value (ratio of air to fuel) is so adjusted by a first regulating circuit (charge pressure regulator) by way of a reference value-actual value comparison that the actual charge pressure corresponds to the charge pressure reference value and, at that charge pressure reference value, there is a given target value in respect of the NOx emission. As the NOx emission is not directly known the charge pressure is used as an auxiliary regulating parameter. The function relationship is in the form of a set of curves, wherein each curve for a given NOx value specifies the relationship between actual power output and charge pressure reference value. In that respect therefore the charge pressure regulator is actually an emission control circuit in relation to the NOx emission (NOx emission control circuit).

Adjustment of the lambda value is effected by way of influencing a gas metering device. The change in the lambda value would in itself cause a change in the power output of the internal combustion engine, which must be compensated by a second regulating circuit (output regulating circuit). That compensation effect in the power regulating circuit is implemented by way of those actuators which directly influence the charge pressure (throttle flap and compressor bypass). The charge pressure is therefore regulated indirectly by way of the lambda value. That regulating strategy is known as the LEANOX® method.

Accordingly therefore the functional relationship between the charge pressure which prevails upstream of the inlet valves of the engine and which can be relatively easily measured and the power output is put to use.

For that purpose the output of the charge pressure measuring means is connected to an actual value input of the first regulating circuit. Arranged in the first regulating circuit of EP 0 259 382 B1 (charge pressure regulator) is a programmable device for ascertaining an power output-dependent reference value for the charge pressure, from the power output measurement signal supplied by the power output measuring means.

In that arrangement regulation of the charge pressure is effected indirectly by way of regulation of the combustion air ratio (lambda) in the air-gas mixture, wherein for example leaning of the mixture (increasing lambda) causes an increase in the charge pressure upstream of the inlet valves (in the situation requiring demand for a constant engine power output). It will be noted however that various disadvantages like for example stability problems and a detrimental transient behaviour (slow start required) arise due to coupling of an power output regulation to regulation of the charge pressure (as an alternative to direct NOx emission regulation), while maintaining a target value of NOx emission.

Figure 1:
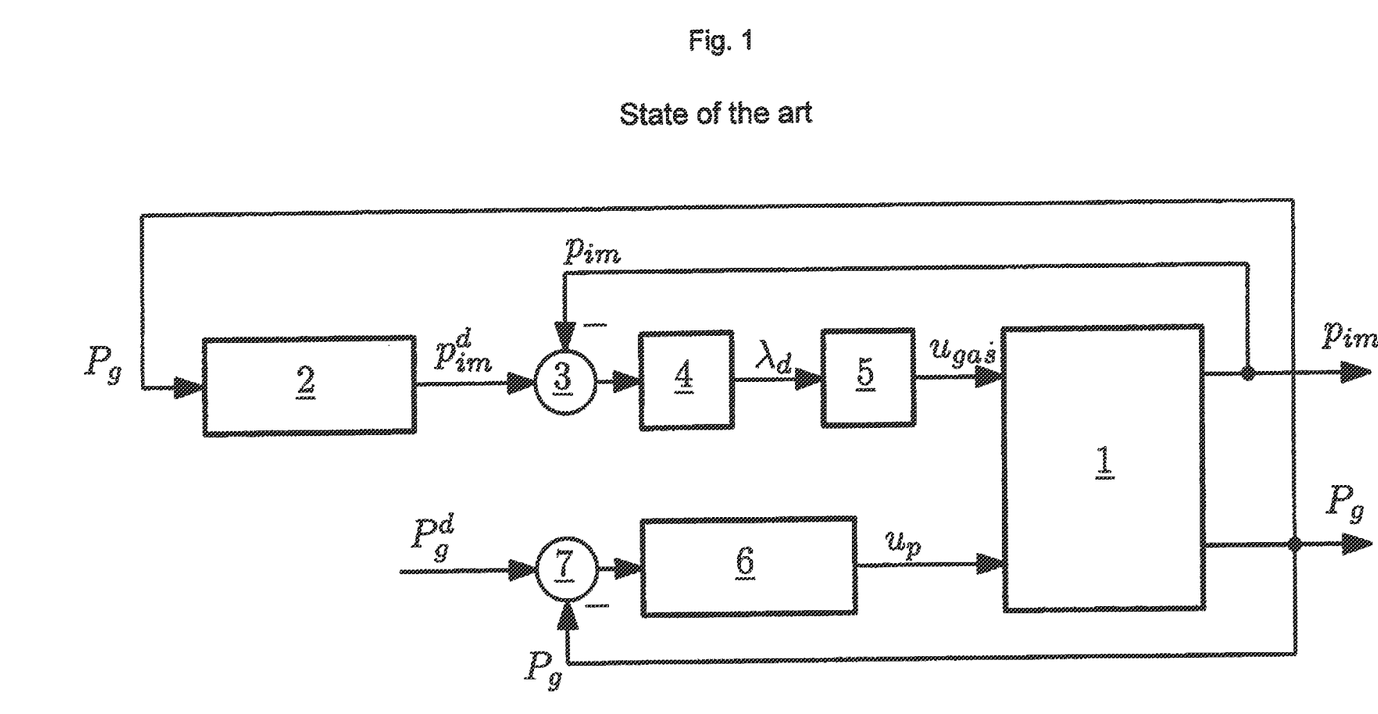
FIG. 1 is a schematic diagram showing a state of the art regulating device.

FIG. 1 shows the state of the art in accordance with EP 0 259 382 B1.

The specified logical units do not have to be in the form of physical components but can be embodied in the form of circuits in the regulating device of the internal combustion engine.

FIG. 1 shows the state of the art in accordance with EP 0 259 382 B1. The Figure diagrammatically shows an internal combustion engine 1 to which a combustion gas mass flow $u_{gas}$ is supplied. The combustion gas mass flow $u_{gas}$ can be influenced by way of a regulator 5 which actuates suitable actuators (for example port injection valves or a gas metering device of a gas mixer).

The regulating circuit shown at the top in FIG. 1 is the NOx emission regulating circuit. In this case the NOx emission regulating circuit includes the structural units or logical relationships denoted by references 2, 3, 4, 5 and the respective input and output parameters. It includes in suitable form (for example in the form of a look-up table or a function) the functional relationship 2 between charge pressure reference value $p^d_{im}$ (as output of the functional relationship 2) and actual power output $P_g$ (as input of the functional relationship 2) for a given NOx value in the form of a curve. The comparator 3 implements a reference-actual comparison between charge pressure reference value $p^d_{im}$ and actual charge pressure $p_{im}$. The deviation $p^d_{im}-p_{im}$ is passed to a PID regulator 4. That outputs a reference value for the lambda value which serves as input for the regulator 5 for actuating the actuators which influence the combustion gas mass flow $u_{gas}$. The regulator 5 can also be in the form of an open-loop control, that is to say without feedback of the target parameter $\lambda^d$.

The circuit shown at the bottom in FIG. 1 is the power output regulating circuit. It includes a further PID regulator 6 which as input is supplied with the deviation $P^d_g-P_g$, determined in a further comparator 7, between reference power output $P^d_g$ and actual power output $P_g$. The PID regulator 6 produces as output suitable control signals $u_p$ for influencing the actual charge pressure $p_{im}$ to those actuators (for example compressor bypass valve or throttle flap valve) which influence on the one hand the actual charge pressure $p_{im}$ and on the other hand the actual power output $P_g$, thereby giving the above-described strong coupling between NOx emission regulating circuit and power output regulating circuit.

SUMMARY OF THE INVENTION

The object of the invention is to provide an internal combustion engine having a regulating device which while retaining compliance with a target value in respect of NOx emission avoids the above-described disadvantages and in particular has a favorable transient behaviour.

That object is attained by an internal combustion engine having a regulating device as described herein. Advantageous configurations are defined in the appendant claims.

The invention also provides that NOx emission regulation is effected by means of the auxiliary parameter of charge pressure, but power output regulation is effected by way of the lambda value.

For that purpose according to the invention it is provided that the power output regulating circuit is adapted to adapt an actual power output of the internal combustion engine to a reference power output of the internal combustion engine by way of adjustment of the lambda value and the NOx emission regulating circuit is adapted by way of a—per se known—functional relationship between reference power output and charge pressure to actuate actuators which influence the charge pressure as an alternative parameter for the NOx emission by the charge pressure in such a way that a target charge pressure can be set for each reference power output of the internal combustion engine.

Unlike the state of the art therefore the invention provides that the charge pressure is set by way of a charge pressure regulator which acts directly, that is to say without involvement of the power output regulation, on the corresponding actuators for influencing the charge pressure. The NOx emission regulating circuit actuates the actuators for influencing the charge pressure in such a way that a target charge pressure is set for each reference power output of the internal combustion engine. Examples of such actuators for influencing the charge pressure are for example a compressor bypass valve, a throttle flap, a variable compressor geometry, a waste gate and a variable turbine geometry. Actuation of the actuators for influencing the charge pressure is therefore not affected in the power output regulating circuit but directly in the NOx emission regulating circuit and only in dependence on the reference power output and not the actual power output. In respect of the regulating circuits therefore there is no coupling of NOx emission regulation and power output regulation, but there is a coupling only by way of the inevitable physical relationships within the internal combustion engine.

It is preferably provided that the NOx emission regulating circuit has a charge pressure regulator by which an actual charge pressure can be adapted to a charge pressure reference value, wherein the charge pressure regulator is either in the form of a first comparator and a first PID regulator or in the form of a model-based regulator.

It can be provided that the power output regulating circuit has a first regulator by which actuators—preferably port injection valves or a gas metering device of a gas mixer—which influence the combustion gas mass flow $u_{gas}$ are actuable, wherein the regulator has either a second comparator and a second PID regulator or is in the form of a model-based regulator.

It can preferably be provided that provided in the power output regulating circuit there is additionally a skip fire regulating module to which the reference power output can be fed as an input and which is adapted to actuate the first regulator for the combustion gas mass flow in such a way that no combustion occurs in selected cylinders of the internal combustion engine in the absence of combustion gas.

In a further preferred embodiment it is provided that the first regulator within the power output regulating circuit is so adapted that further actual parameters can be fed to the regulator as the input thereof, wherein the regulator limits the control parameter of the lambda value having regard to the further actual parameters in such a way that when limit values of the actual parameters are reached no further change in the control parameter of the lambda value occurs in a direction which further adversely influences the actual parameter(s). A detrimental influence would be for example further enriching (lower lambda value) with an already high exhaust gas temperature at the discharge side of the internal combustion engine or a leaning effect (higher lambda value) in the presence of misfiring signals of cylinders of the internal combustion engine.

It can be provided that disposed upstream of the power output regulating circuit and the NOx emission regulating circuit is a trajectory generator adapted to convert a non-steady abrupt presetting of the reference power output by a user into a steady trajectory for the reference power output.

It can preferably be provided that the trajectory generator is adapted to additionally receive the actual power output as input and to monitor a deviation between the instantaneous value of the reference power output in accordance with the steady function and the actual power output such that in the event of an excessively large deviation the steady trajectory of the reference power output is limited to a given value above the actual power output.

There can be provided a dead time compensation device which is adapted to acquire the reference power output, the actual power output and the actual charge pressure at a time and output same again as an output in a form predicted into the future by a dead time D. The dead time D is either estimated continuously during operation by means of suitable models or is determined to start with from tests.

Preferably it can be provided that there is provided a further regulator which is adapted to acquire the output of the dead time compensation device as input and to output a reference value for the lambda value in dependence on the input.

BRIEF DESCRIPTION OF THE DRAWINGS

Further advantages and details of the invention will now be discussed for various embodiments by way of example with reference to the drawings, in which.

DETAILED DESCRIPTION OF THE INVENTION

Figure 2:
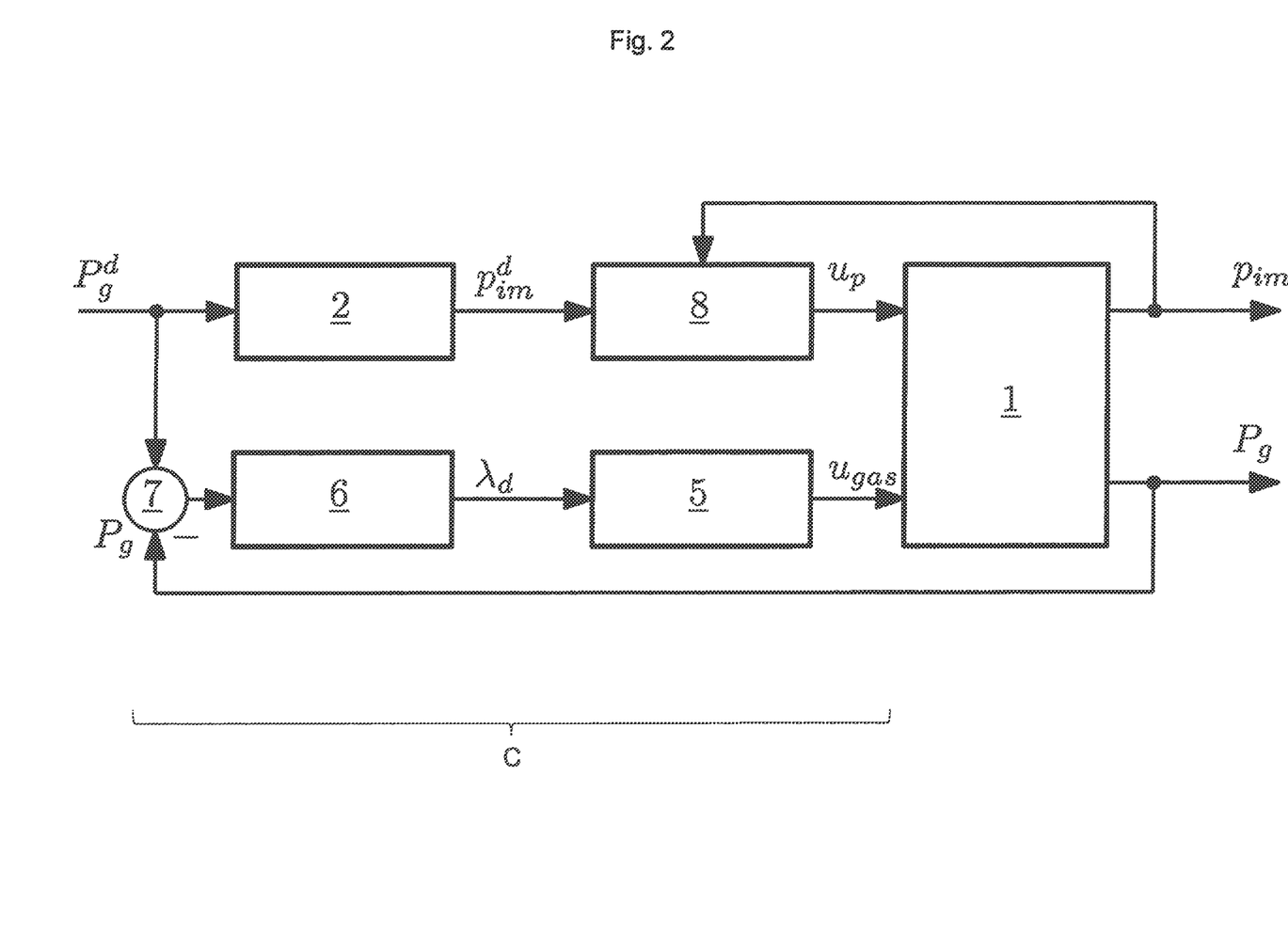
FIGS. 2-7 are schematic diagrams showing a regulating device of the present invention.

FIG. 2 shows a first embodiment of the invention, wherein the same references denote the same components or logical procedures as in FIG. 1.

In comparison with FIG. 1, it is possible to see as a first difference that the NOx emission regulating circuit, instead of the actual power output $P_g$ of the internal combustion engine 1, involves the reference power output $P^d_g$ of the internal combustion engine 1 as the input of the functional relationship 2. In the present case therefore that gives the relationship between charge pressure reference value $p^d_{im}$ (output of the functional relationship 2) and reference power output $P^d_g$ (input of the functional relationship 2) for a given NOx value in the form of a curve.

In the NOx emission regulating circuit the charge pressure reference value $p^d_{im}$ is passed to a charge pressure regulator 8 as the input. That charge pressure regulator 8 could certainly be in the form of a comparator 3 and a PID regulator 4 as shown in FIG. 1. A configuration in the form of a model-based regulator however is preferred, which in addition to the currently prevailing actual charge pressure $p_{im}$ also needs the charge pressure reference value $p^d_{im}$ as the input. Unlike FIG. 1 the output of the charge pressure regulator 8 is implemented in the form of control signals $u_p$ to those actuators (for example compressor bypass valve or throttle flap valve) which influence the actual charge pressure $p_{im}$. Those control signals $u_p$ were in FIG. 1 the output of the PID regulator 6 and thus the power output regulating circuit. Because those control signals $u_p$ in FIG. 2 are part of the NOx emission regulating circuit the strong coupling in FIG. 1 between the NOx emission regulating circuit and the power output regulating circuit does not occur with the invention.

The power output regulating circuit in FIG. 2 differs from that in FIG. 1 only in that the regulator 5 which actuates the actuators (for example port injection valves or gas metering device of a gas mixer) which influence the combustion gas mass flow $u_{gas}$ is arranged in the power output regulating circuit. Instead of the arrangement of comparator 7 and PID regulator 6 it would also be possible to provide a model-based regulator.

In the simplest case the functional relationship 2 occurs in the above-described form as a simple curve. As is already known from the specifications founded on EP 0 259 382 B1 the functional relationship 2 can be corrected by incorporation of corrections in respect of the ignition timing, inlet temperature and so forth.

To sum up various advantages are linked to the invention:
faster adaptive control in respect of load changes is possible (faster adaptation of the actual power output $P_g$ of the internal combustion engine 1 to a change in the reference output $P^d_g$),
the target emission values for NOx can be attained substantially earlier upon load changes, and
the emission values for NOx already remain closer to the desired value during a load change because the functional relationship 2 can be more easily followed.

Figure 3:
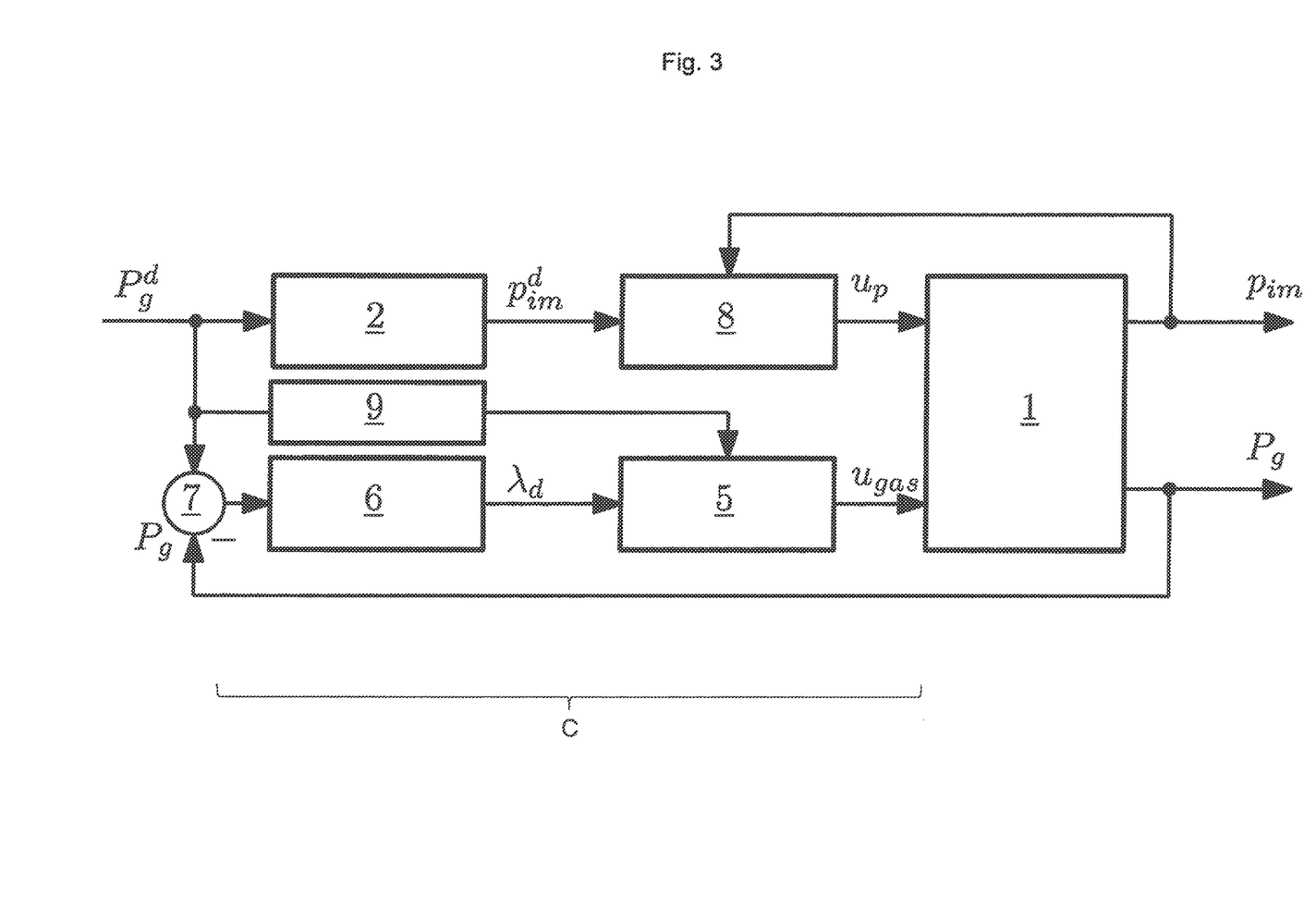

FIG. 3 shows a second embodiment of the invention. In comparison with FIG. 2, the power output regulating circuit additionally has a skip fire regulating module 9 to which the reference power output $P^d_g$ is passed as input. The output of the skip fire regulating module 9 goes to the regulator 5 controlling the combustion gas mass flow $u_{gas}$ in such a way that in selected cylinders of the internal combustion engine 1 no combustion takes place in the absence of combustion gas. That permits rapid adaptation to load changes. That is advantageous for port injection internal combustion engines.

Figure 4:
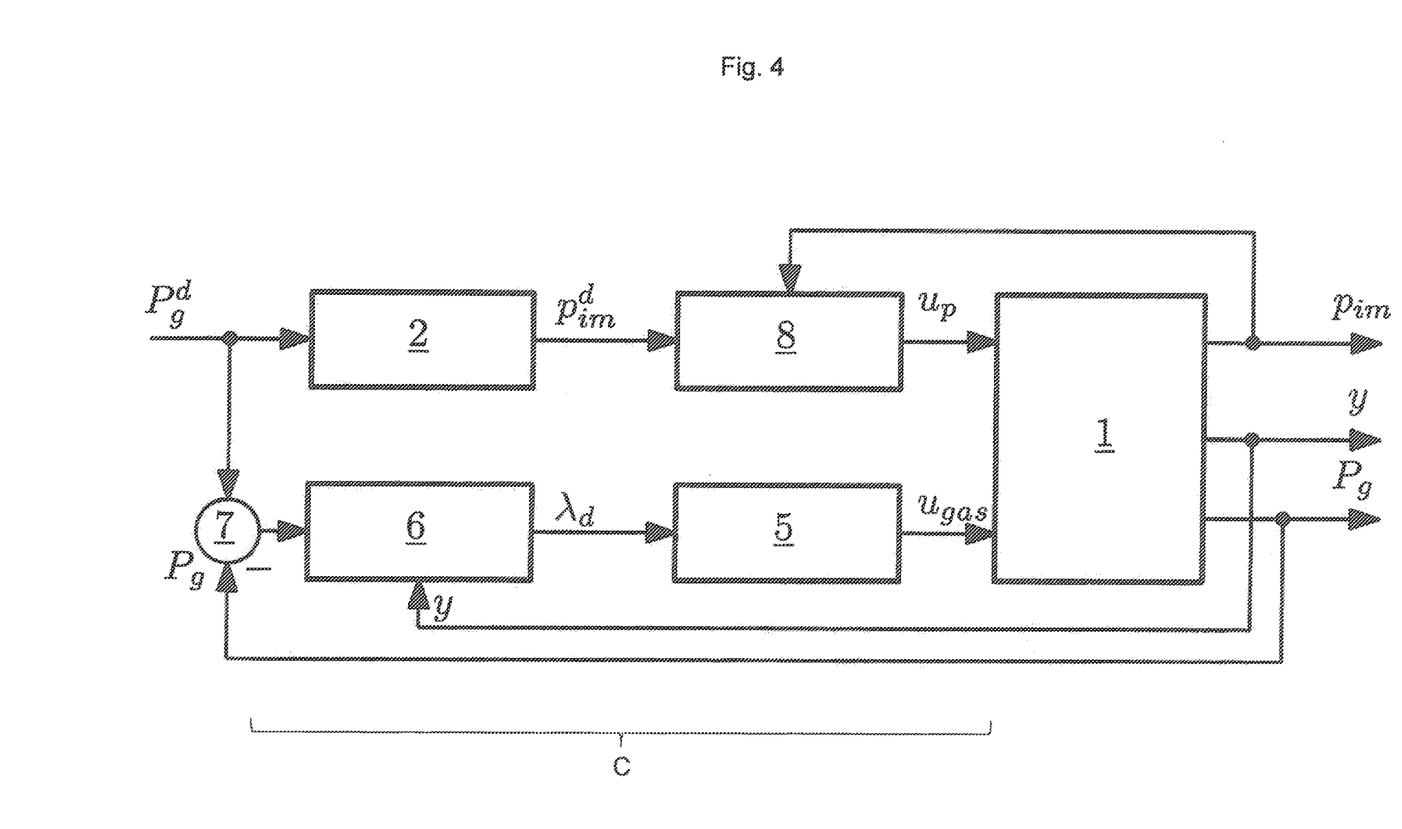

FIG. 4 shows a third embodiment of the invention. In comparison with FIG. 2 this additionally involves the feedback of further actual parameters y (here exhaust gas temperature at the discharge side of the internal combustion engine 1 or the intake side of a possibly provided exhaust gas post-treatment unit (not shown) and/or knock or misfire signals of cylinders of the internal combustion engine 1 and/or oil temperature and/or water coolant temperature and/or charge air temperature upstream of the cylinders as an input of the PID regulator 6 within the power output regulating circuit. They limit the control parameter $\lambda_d$ such that when limit values of the actual parameters are reached there is no further change of $\lambda_d$ in a direction which further adversely influences the actual parameters. Adverse influence would be for example further enrichment (lower lambda value) at an already high exhaust gas temperature at the discharge side of the internal combustion engine 1 or a leaning effect (higher lambda value) when there are misfiring signals of cylinders of the internal combustion engine 1. The feedback of further actual parameters y therefore represents a safety loop, by which influencing of the control parameter $\lambda_d$ occurs only in limits which are tolerable for the internal combustion engine 1.

Figure 5:
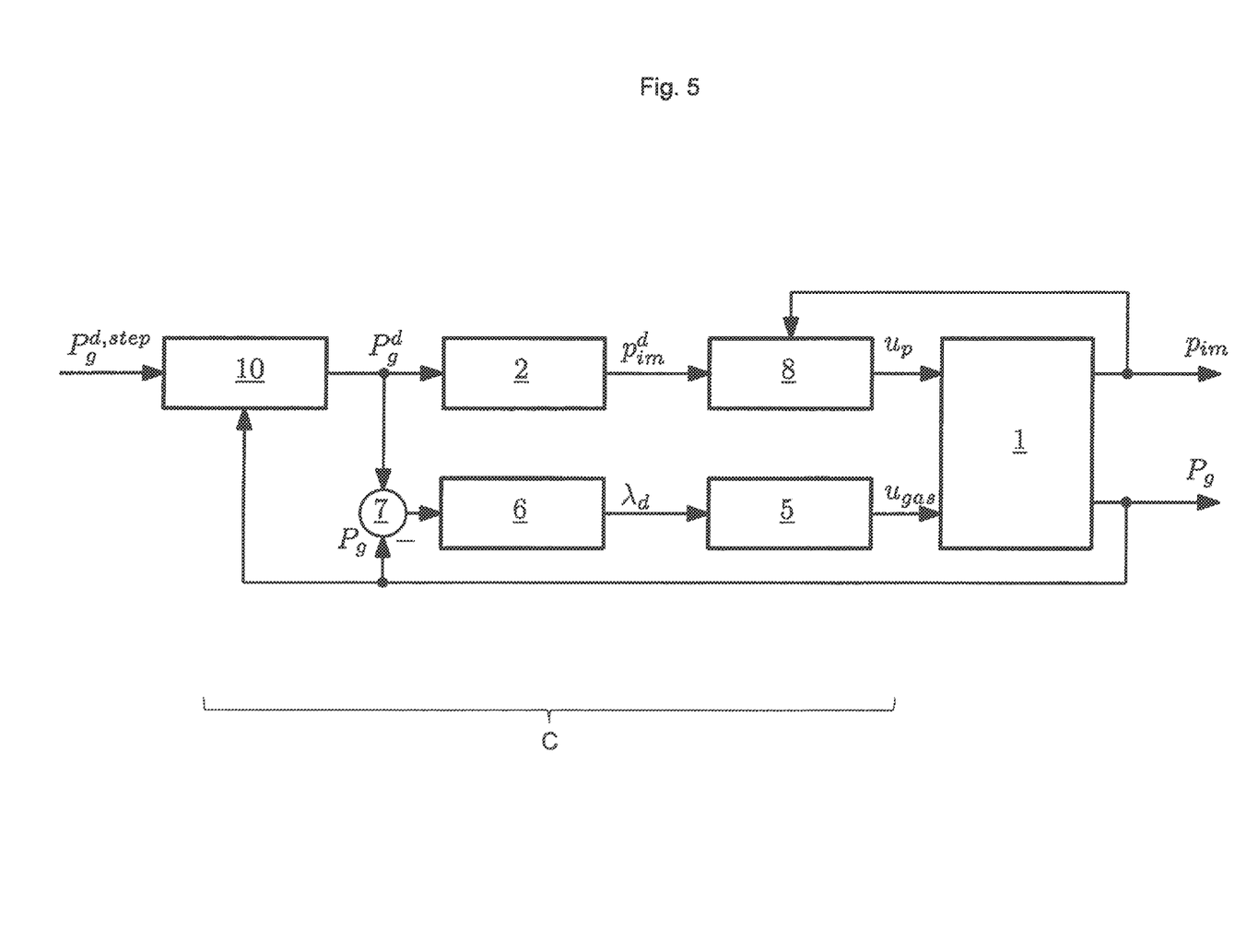

FIG. 5 shows a fourth embodiment of the invention, wherein a trajectory generator 10 is disposed upstream of the functional relationship 2 in comparison with FIG. 2. It converts a non-steady abrupt presetting of the reference power output $P^{d,step}_g$ by a user into a steady trajectory for the reference power output $P^d_g$. Starting from a present currently prevailing value of the reference power output $P^d_g$ and a desired end value in respect of the reference power output $P^d_g$ a steady function linking those values is selected, for example in the form of a (preferably linear) ramp or in the form of a polynomial or the like. In addition the actual power output $P_g$ can be fed as an input to the trajectory generator 10. In that way it is possible to monitor the deviation between the instantaneous value of the reference power output $P^d_g$ in accordance with the steady function and the actual power output $P_g$ such that, in the event of an excessive deviation, the steady function of the reference power output $P^d_g$ is limited to a given value above the actual power output $P_g$. That case can be relevant for example with a cold internal combustion engine 1.

Figure 6:
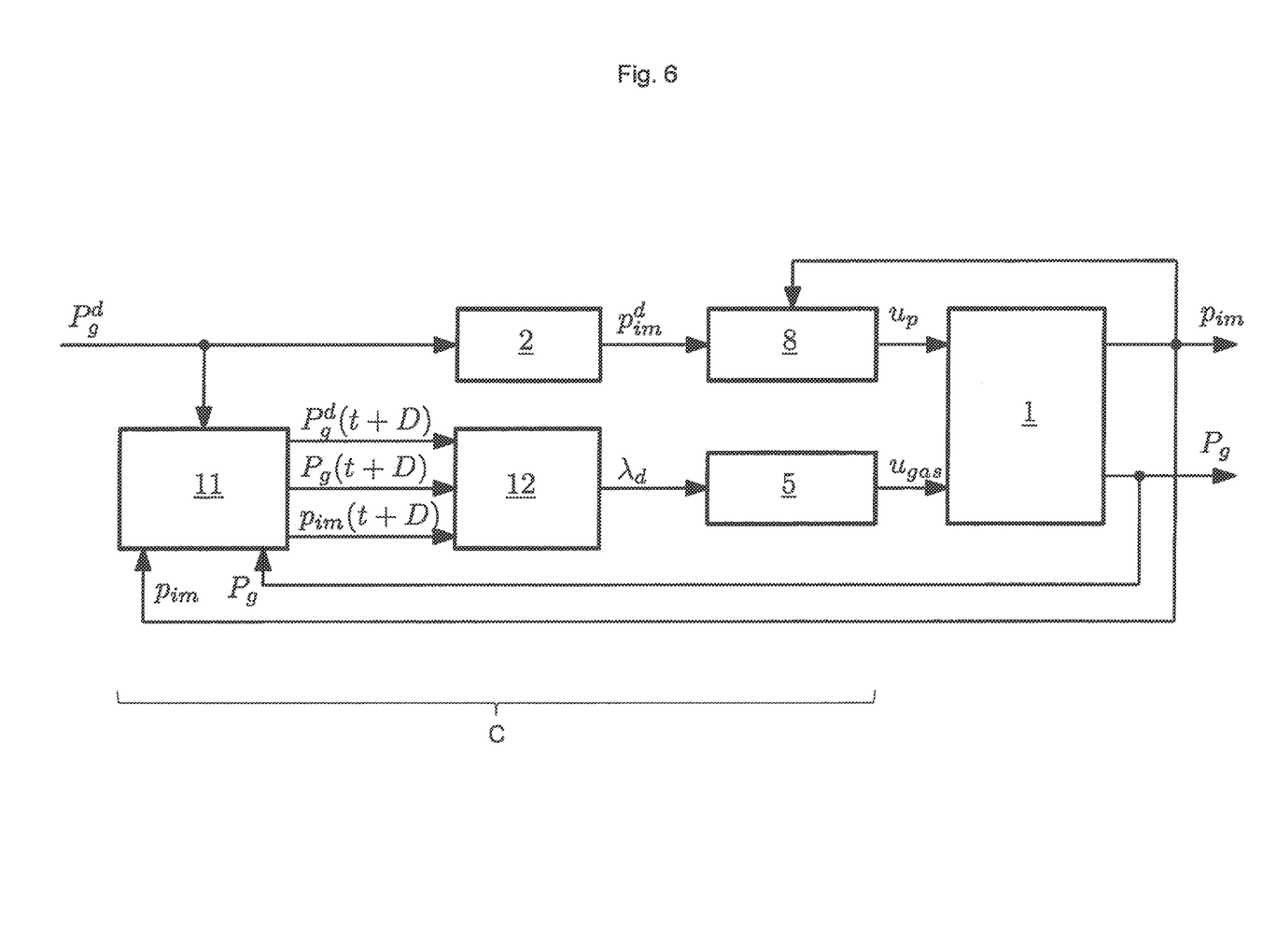

FIG. 6 shows a fifth embodiment of the invention in which there is provided a dead time compensation device 11 in comparison with FIG. 2. That is advantageous in particular for mixture-charge internal combustion engines 1. The input to the dead time compensation device 11 are the reference power output $P^d_g$, the actual power output $P_g$ and the actual charge pressure $p_{im}$. The input signals $P^d_g(t)$, $P_g(t)$, $p_{im}(t)$ at a time t are output again as the output in a form $P^d_g(t+D)$, $P_g(t+D)$, $p_{im}(t+D)$ predicted into the future t+D by a dead time D (time which lies between a change in the combustion gas mass flow and the corresponding reaction of the internal combustion engine 1 in the actual power output $P_g$). That output serves as an input for a regulator 12 which outputs a reference value for the lambda value in dependence on the input. Prediction is effected in per se known manner in model-based fashion by integration of those differential equations which describe the dynamic behaviour of those parameters. Those differential equations are well known to the man skilled in the art.

Figure 7:
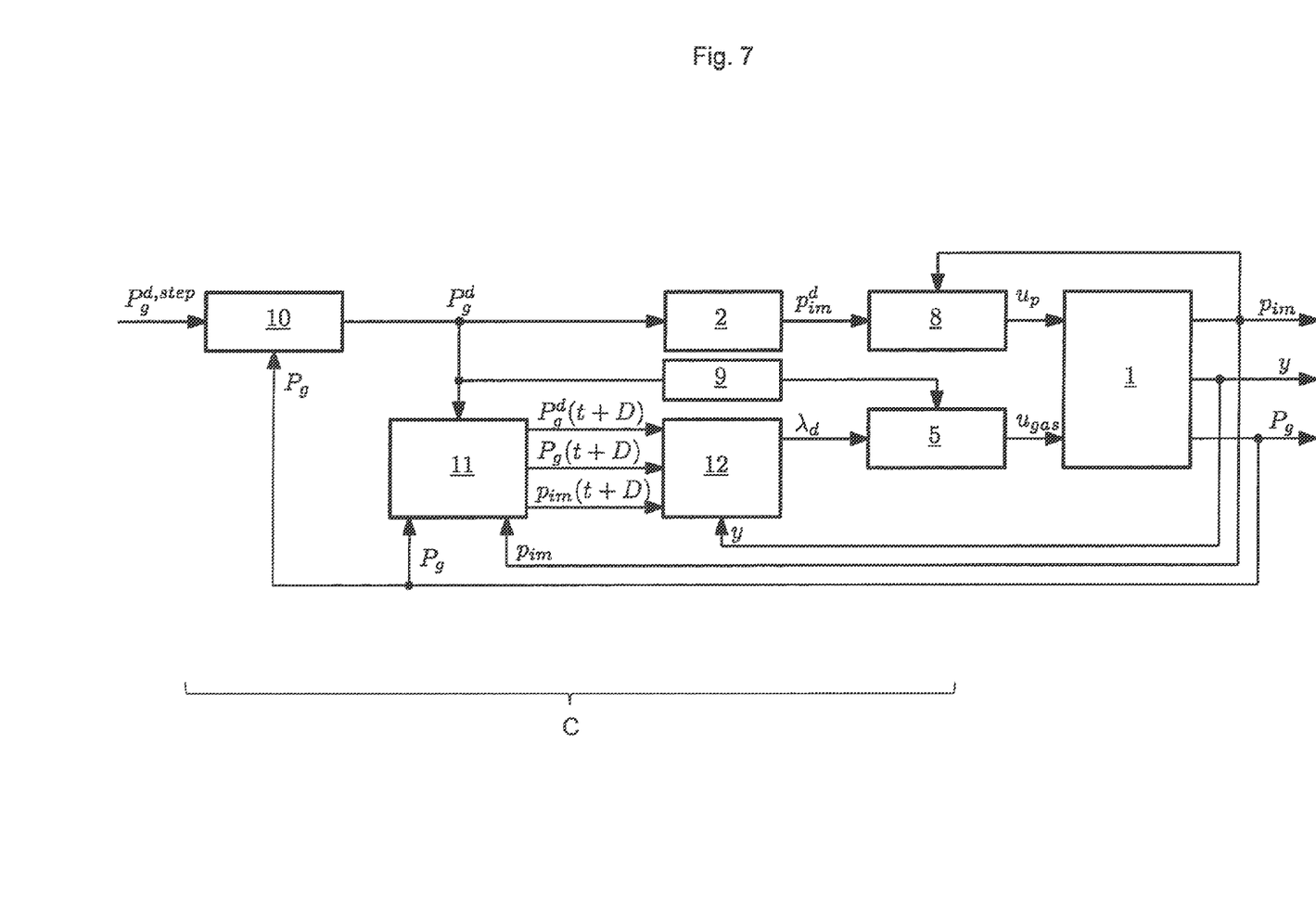

FIG. 7 shows an embodiment of the invention in which all measures of the above-discussed embodiments are jointly provided. Naturally it would also be possible here to omit individual measures. The structural units and logical relationships required for open-loop control/closed-loop control are combined together for all embodiments in the regulating device C. The term "regulator" in the context of the present invention does not necessarily mean a physical unit but a given function which can be implemented for example by a circuit, memory and so forth.

LIST OF REFERENCES USED 1 internal combustion engine
2 functional relationship
3 first comparator
4 first PID regulator
5 first regulator
6 second PID regulator
7 second comparator
8 charge pressure regulator
9 skip fire regulating module
10 trajectory generator
11 dead time compensation device
12 further regulator
$\lambda_d$ reference lambda value (reference value for combustion air ratio)
$\lambda$ lambda value (combustion air ratio)
$P^d_g$ reference power output
$P_g$ actual power output
$P^{d,step}_g$ abrupt presetting of the reference output
$p_{im}$ actual charge pressure
$p^d_{im}$ charge pressure reference value
t time
C regulating device
D dead time
$u_{gas}$ combustion gas mass flow
$u_p$ open-loop control signals influencing the actual charge pressure
y actual parameters of the internal combustion engine 1 and/or downstream-connected units

The invention claimed is:

1. An internal combustion engine having a regulating device, wherein an air-fuel mixture having a combustion air ratio adjustable by the regulating device, is burnt in the internal combustion engine, the regulating device comprising:

a power output regulating circuit configured to change an actual power output of the internal combustion engine to a reference power output of the internal combustion engine by an adjustment of the combustion air ratio; and a NOx emission regulating circuit configured to use a functional relationship to actuate actuators influencing a charge pressure for NOx emission regulation, based on a charge pressure reference value set for each reference power output of the internal combustion engine;

wherein the charge pressure reference value is set using reference power output, instead of actual power output of the internal combustion engine, and there is no coupling of NOx emission regulation and power output regulation.

2. The internal combustion engine as set forth in claim 1, wherein the NOx emission regulating circuit comprises a charge pressure regulator operable to change the charge pressure to a charge pressure reference value, wherein the charge pressure regulator is a comparator and a PID regulator combination, or a model-based regulator.

3. The internal combustion engine as set forth in claim 1, wherein the power output regulating circuit comprises a regulator operable to actuate the actuators which influence a combustion gas mass flow, wherein the regulator is a comparator and a PID regulator combination, or a model-based regulator.

4. The internal combustion engine as set forth in claim 1, wherein the power output regulating circuit comprises a skip fire regulating module to which the reference power output can be fed as an input and which is configured to actuate a regulator for a combustion gas mass flow such that no combustion occurs in selected cylinders of the internal combustion engine in a state in which combustion gas is absent.

5. The internal combustion engine as set forth in claim 1, wherein a regulator within the power output regulating circuit is configured such that further actual parameters can be fed to the regulator as an input thereof, wherein the regulator limits a control parameter reference combustion air ratio with regard to the further actual parameters such that when limit values of the further actual parameters are reached, no further change in the control parameter reference combustion air ratio occurs in a direction which further adversely influences the further actual parameters.

6. The internal combustion engine as set forth in claim 1, further comprising a trajectory generator configured to convert a non-steady abrupt presetting of the reference power output by a user into a steady trajectory for the reference power output, wherein the trajectory generator is upstream of the power output regulating circuit and the NOx emission regulating circuit.

7. The internal combustion engine as set forth in claim 6, wherein the trajectory generator is further configured to receive the actual output of the internal combustion engine as an input and to monitor a deviation between an instantaneous value of the reference power output in accordance with a steady function and the actual output of the internal combustion engine such that, in an event of an excessively large deviation, the steady trajectory of the reference power output is limited to a given value above the actual output of the internal combustion engine.

8. The internal combustion engine as set forth in claim 1, further comprising a dead time compensation device to which a predeterminable dead time can be fed and which is configured to acquire the reference power output, the actual output of the internal combustion engine, and an actual charge pressure at a time and output same as an output in a form predicted into a future.

9. The internal combustion engine as set forth in claim 8, further comprising a regulator which is configured to acquire an output of the dead time compensation device as an input and to output a reference combustion air ratio in dependence on the input.

10. The internal combustion engine as set forth in claim 3, wherein the actuators comprise port injection valves.

11. The internal combustion engine as set forth in claim 3, wherein the actuators comprise a gas metering device of a gas mixer.

* * * * *